(12) United States Patent
Koo

(10) Patent No.: US 10,836,345 B2
(45) Date of Patent: Nov. 17, 2020

(54) AIRBAG DEVICE FOR PANORAMA ROOF

(71) Applicant: HYUNDAI MOBIS CO., LTD., Seoul (KR)

(72) Inventor: You Hoe Koo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 84 days.

(21) Appl. No.: 16/243,658

(22) Filed: Jan. 9, 2019

(65) Prior Publication Data

US 2019/0210555 A1 Jul. 11, 2019

(30) Foreign Application Priority Data

Jan. 9, 2018 (KR) .......................... 10-2018-0002593

(51) Int. Cl.
*B60R 21/213* (2011.01)
*B60R 21/2334* (2011.01)
*B60R 21/237* (2006.01)
*B60R 21/26* (2011.01)
*B60R 21/231* (2011.01)

(52) U.S. Cl.
CPC ........ *B60R 21/2334* (2013.01); *B60R 21/213* (2013.01); *B60R 21/237* (2013.01); *B60R 21/26* (2013.01); *B60R 2021/23192* (2013.01)

(58) Field of Classification Search
CPC ... B60R 21/2334; B60R 21/213; B60R 21/26; B60R 2021/23192
See application file for complete search history.

(56) References Cited

U.S. PATENT DOCUMENTS

| | | | |
|---|---|---|---|
| 9,610,915 B2 * | 4/2017 | Specht ................. | B60R 21/214 |
| 9,771,048 B2 * | 9/2017 | Min ...................... | B60R 21/214 |
| 10,427,637 B2 * | 10/2019 | Raikar ................. | B60R 21/013 |
| 10,639,973 B2 * | 5/2020 | Sommer ................ | B60R 21/06 |

* cited by examiner

*Primary Examiner* — Faye M Fleming
(74) *Attorney, Agent, or Firm* — Knobbe Martens Olson & Bear LLP

(57) ABSTRACT

An airbag device for a panorama roof may include: a panorama roof; a guide disposed under the panorama roof; a folded cushion supported by the guide; an operation unit mounted on the guide, and configured to operate the folded cushion to cover the panorama roof; an inflator configured to supply gas to the cushion; and a controller configured to control the operations of the operation unit and the inflator.

9 Claims, 5 Drawing Sheets

AIRBAG DEVICE FOR PANORAMA ROOF

CROSS-REFERENCES TO RELATED APPLICATIONS

The present application claims priority to Korean application number 10-2018-0002593, filed on Jan. 9, 2018, which is incorporated by reference in its entirety.

BACKGROUND OF THE INVENTION

The present invention relates to an airbag device for a panorama roof, and more particularly, to an airbag device for a panorama roof, which can prevent a passenger from being injured or thrown out of a vehicle, even when the roof is damaged in case of a rollover accident of the vehicle.

In general, a vehicle transports passengers. The vehicle has an airbag device for the safety of a driver or passenger. For example, airbag devices are installed at the front, both sides and the top of the vehicle. The airbag device includes an inflator and an airbag. When a certain magnitude of external shock is applied to the vehicle, the airbag is expanded while gas generated from the inflator is injected into the airbag. The airbag is rapidly expanded to protect the body of a passenger. When the vehicle is turned over, the airbag installed at the top of the vehicle is expanded. The airbag is unfolded toward the central part from both sides of a panorama roof.

In the related art, however, since the airbag installed at the top of the vehicle is unfolded toward the central part from both sides of the panorama roof, the central part of the panorama roof may not be completely covered by the airbag, which increases the possibility that a passenger will be injured. Furthermore, since the support force of the airbag is weak at the central part of the panorama roof, the airbag may be separated from the central part of the panorama roof. Therefore, there is a demand for a device capable of solving the problem.

SUMMARY OF THE INVENTION

Embodiments of the present invention are directed to an airbag device for a panorama roof, which can prevent a passenger from being injured or thrown out of a vehicle, even when the roof is damaged in case of a rollover accident of the vehicle.

In one embodiment, an airbag device for a panorama roof may include: a panorama roof; a guide disposed under the panorama roof; a folded cushion supported by the guide; an operation unit mounted on the guide, and configured to operate the folded cushion to cover the panorama roof; an inflator configured to supply gas to the cushion; and a controller configured to control the operations of the operation unit and the inflator.

The guide may include: a guide rail disposed at both sides of the panorama roof in the longitudinal direction of the panorama roof; and a guide rod formed in the guide rail, and supporting the cushion.

The guide rail may include: a rail fixing part disposed at both sides of the panorama roof, and seated and fixed onto a frame part; a rail induction part extended from the rail fixing part toward the panorama roof, guiding the cushion, and having the operation unit mounted thereon; and a rail support part extended from the rail induction part toward the panorama roof, and supporting the guide rod.

The guide rail may further include a rail insertion part extended downward from the rail induction part and inserted into the frame part.

The rail induction part may include: an induction extension part extended from the rail fixing part toward the panorama roof; and an induction hole formed in the induction extension part so as to guide the cushion inserted therein.

The induction hole may include: a hole center part formed in the induction extension part, such that gas provided from the operation unit is moved through the hole center part; and a hole side part communicating with the hole center part at the outside of the induction extension part.

The cushion may include: a folded cushion body; a plurality of cushion rings formed at the edge of the cushion body, and having the guide rod installed therethrough; and a cushion moving part formed on one of the cushion rings, and inserted into the hole center part through the hole side part.

The cushion moving part may be formed on the leading one of the plurality of cushion rings.

The cushion moving part may include: a movement insertion part extended from the leading cushion ring, and inserted into the hole side part; and a movement impelling part formed at an end of the movement insertion part, disposed in the hole center part, and moved by gas discharged from the operation unit.

The controller may sequentially operate the operation unit and the inflator, when a vehicle accident occurs.

DESCRIPTION OF SPECIFIC EMBODIMENTS

Hereafter, an airbag device for a panorama roof in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
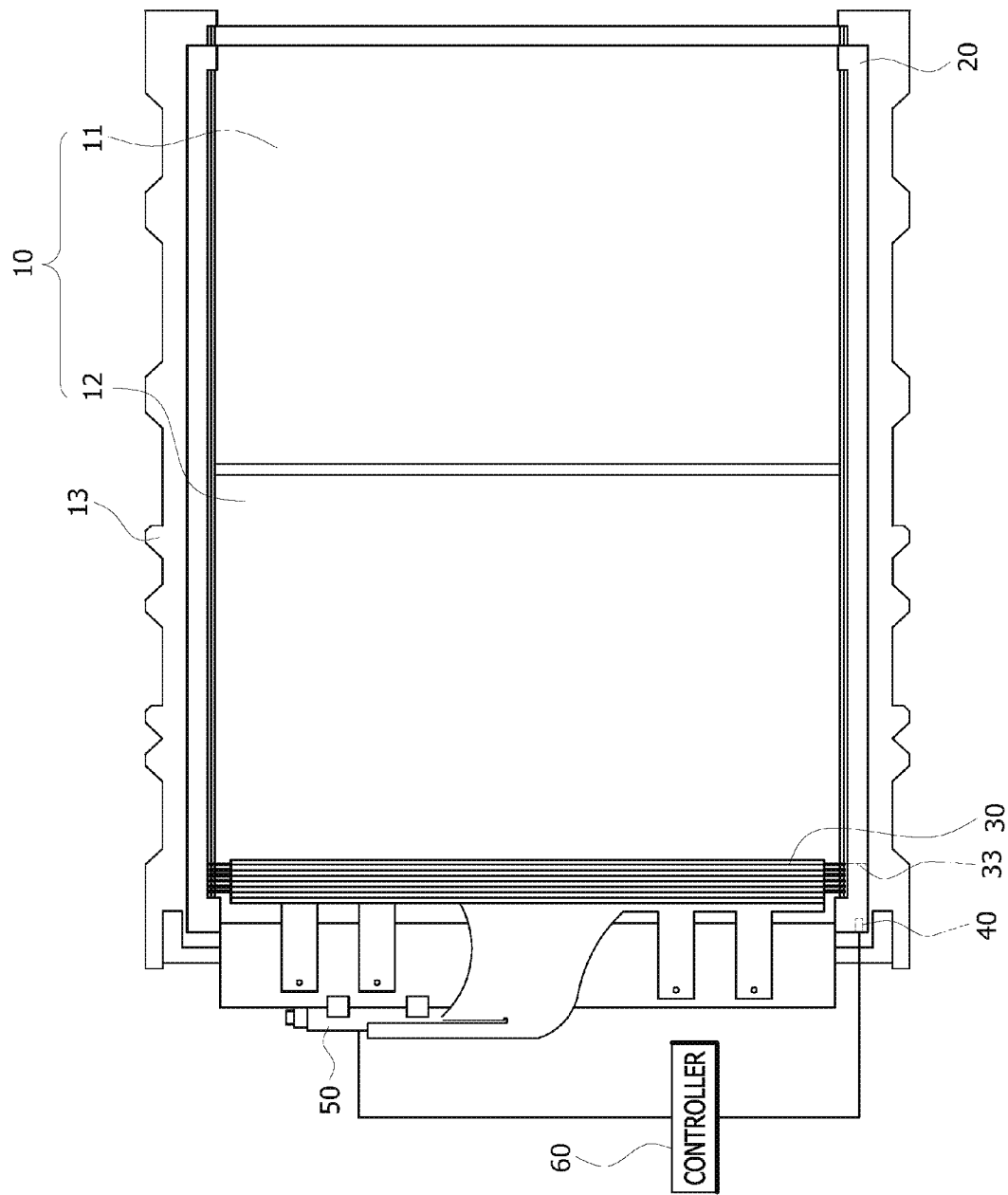
FIG. 1 schematically illustrates a state before an airbag device for a panorama roof in accordance with an embodiment of the present invention is deployed.
Figure 2:
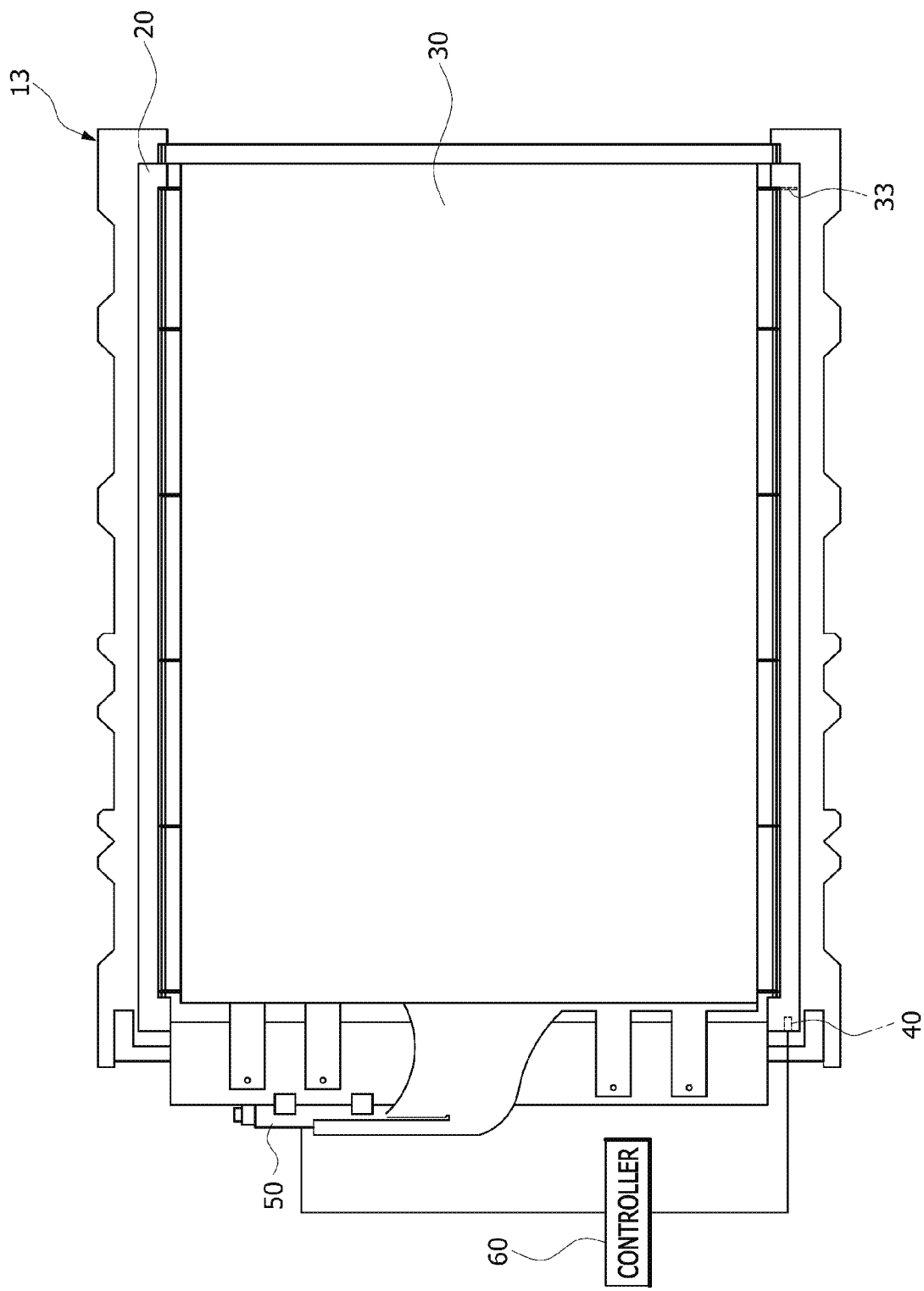
FIG. 2 schematically illustrates a state after the airbag device for a panorama roof in accordance with the embodiment of the present invention is deployed.

FIG. 1 schematically illustrates a state before an airbag device for a panorama roof in accordance with an embodiment of the present invention is deployed, and FIG. 2 schematically illustrates a state after the airbag device for a panorama roof in accordance with the embodiment of the present invention is deployed. Referring to FIGS. 1 and 2, the airbag device 1 for a panorama roof in accordance with the embodiment of the present invention may include a panorama roof 10, a guide 20, a cushion 30, an operation unit 40, an inflator 50 and a controller 60.

The panorama roof 10 may be formed on the ceiling of a vehicle, and made of a transparent material. For example, the panorama roof 10 may have a length in the longitudinal direction of the vehicle, and include first and second windows 11 and 12 which are supported by a frame part 13 constituting the ceiling frame of the vehicle. The first window 11 may be slid from the frame part 13, in order to open/close the ceiling of the vehicle.

The guide 20 may be disposed under the panorama roof 10. For example, the guide 20 may have a length in the longitudinal direction of the panorama roof 10, and the exposure of the guide 20 may be limited because the guide 20 is covered by an interior material which covers the edge of the panorama roof 10.

Before a collision of the vehicle, the cushion 30 may be supported by the guide 20, and maintain a folded state. For example, the cushion 30 may be formed of an elastic material or fabric material, and maintain a folded state through sewing. When a sewed portion is broken by an external force, the cushion 30 may be unfolded. At the initial stage, the cushion 30 may be disposed at the rear end of the panorama roof 10, and covered by an interior material to limit the exposure of the cushion 30.

The operation unit 40 may be mounted on the guide 20, and deploy the folded cushion 30 to cover the panorama roof 10. For example, a squib to push the cushion 30 through a gunpowder explosion may be used as the operation unit 40.

The inflator 50 may supply gas to the cushion 30. For example, the inflator 50 may be fixed to the rear end of the frame part 13, and connected to the cushion 30. The completely deployed cushion 30 may be inflated by the gas supplied from the inflator 50.

The controller 60 may control the operations of the operation unit 40 and the inflator 50. For example, the controller 60 may receive a collision detection signal when a vehicle accident occurs, and sequentially operate the operation unit 40 and the inflator 50.

Figure 3:
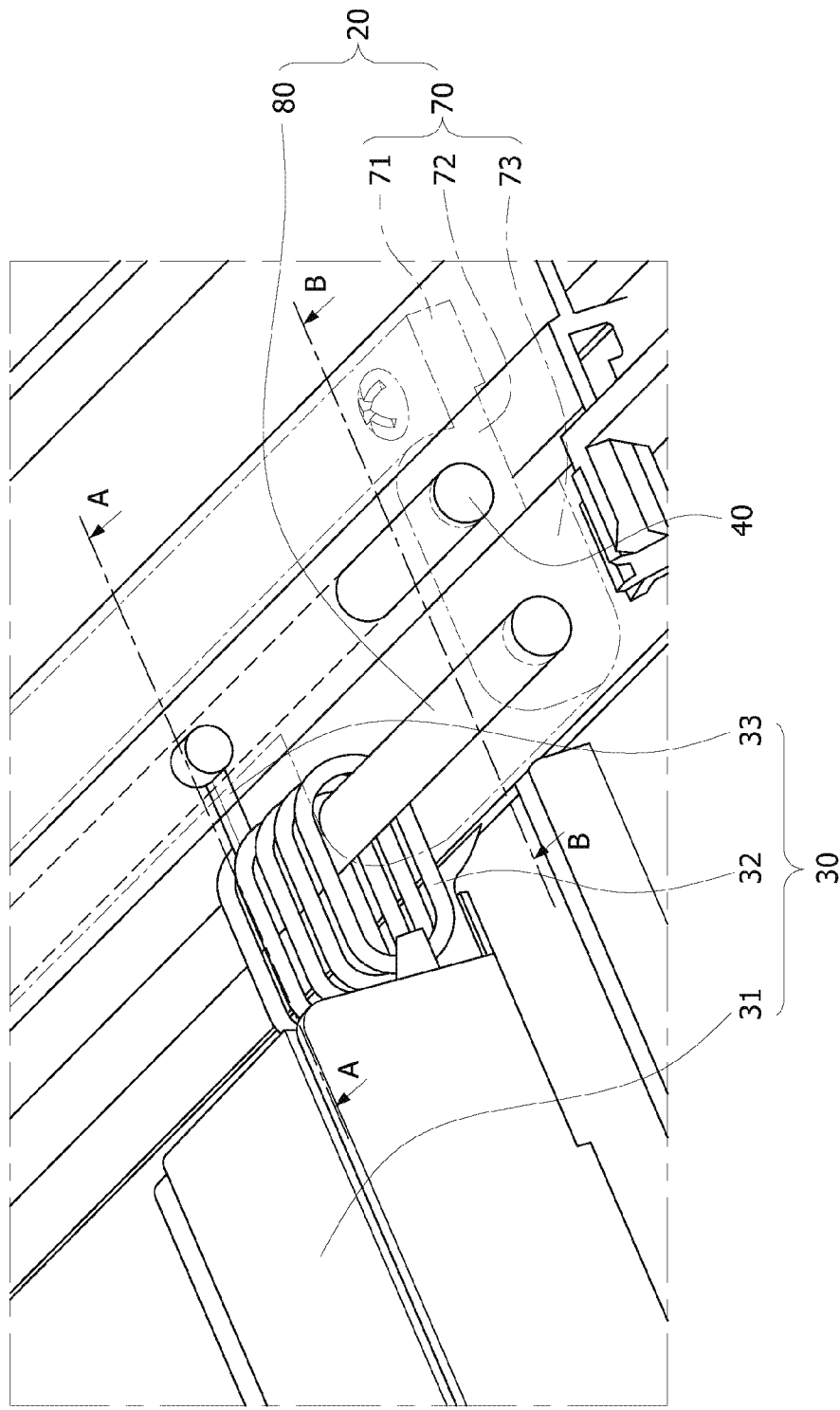
FIG. 3 schematically illustrates a guide of the airbag device for a panorama roof in accordance with the embodiment of the present invention.
Figure 4:
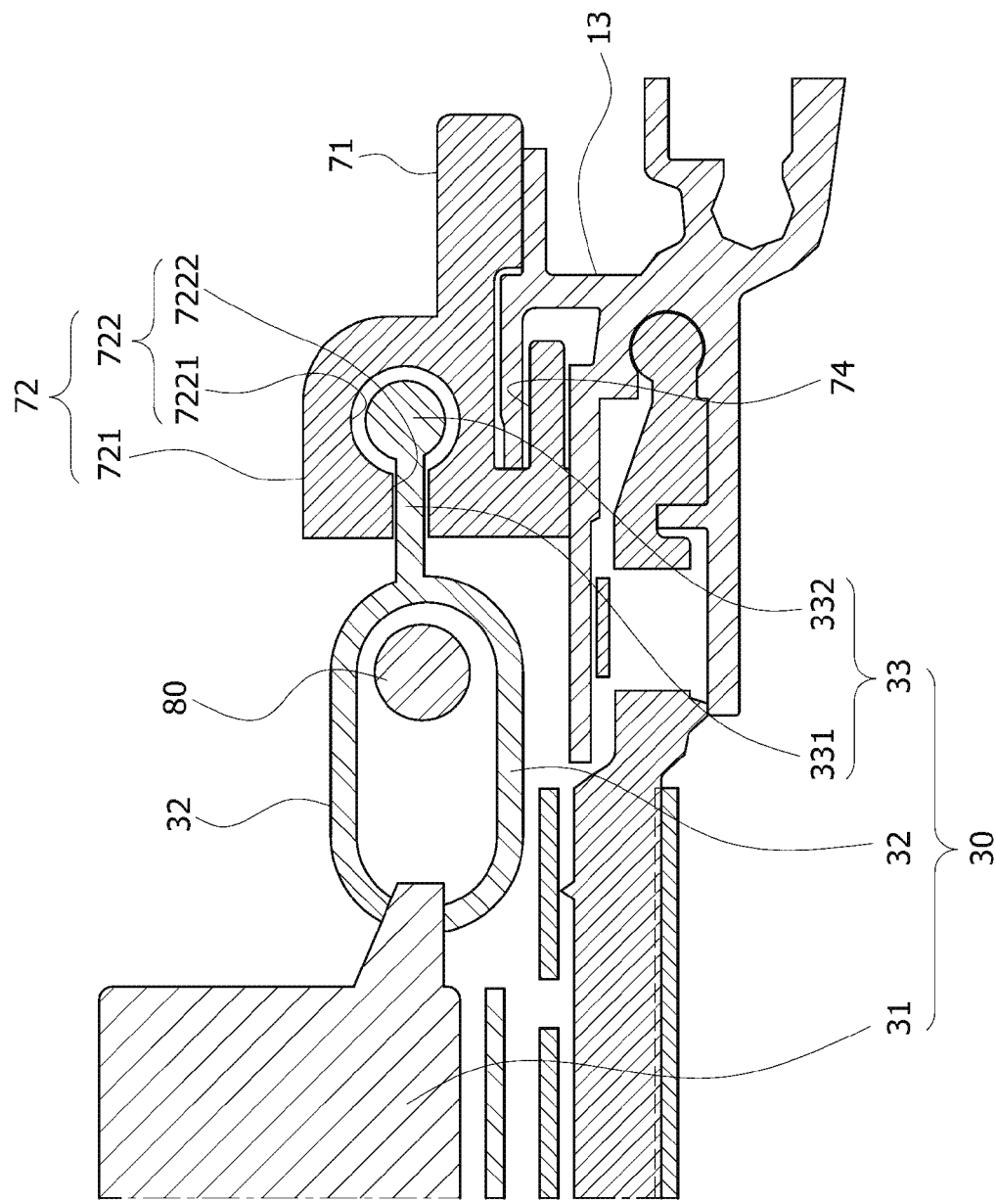
FIG. 4 is a cross-sectional view taken along the line A-A of FIG. 3.
Figure 5:
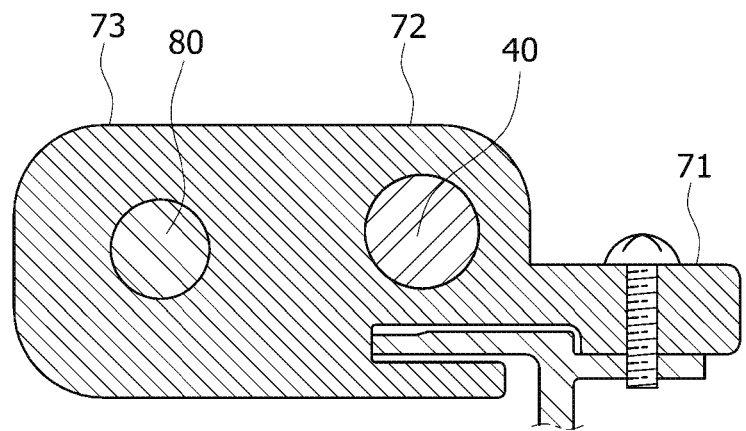
FIG. 5 is a cross-sectional view taken along the line B-B of FIG. 3.

FIG. 3 schematically illustrates the guide of the airbag device for a panorama roof in accordance with the embodiment of the present invention, FIG. 4 is a cross-sectional view taken along the line A-A of FIG. 3, and FIG. 5 is a cross-sectional view taken along the line B-B of FIG. 3. Referring to FIGS. 3 to 5, the guide 20 in accordance with the embodiment of the present invention may include a guide rail 70 and a guide rod 80.

The guide rail 70 may be disposed at both sides of the panorama roof 10 in the longitudinal direction. For example, the guide rail 70 may be disposed at each of the left and right sides of the panorama roof 10, and coupled and fixed to the frame part 13. The guide rail 70 may have a length corresponding to the panorama roof 10.

The guide rod 80 may be formed in the guide rail 70, and serve to support the cushion 30. For example, the guide rod 80 may have a length corresponding to the deployment length of the cushion 30, and support the cushion 30 like a curtain rod for supporting a curtain.

The guide rail 70 in accordance with the embodiment of the present invention may include a rail fixing part 71, a rail induction part 72 and a rail support part 73.

The rail fixing part 71 may be disposed at both sides of the panorama roof 10, and seated and fixed onto the frame part 13. For example, the rail fixing part 71 may have a length corresponding to the panorama roof 10. An end of the rail fixing part 71 may be disposed at the rear of the folded cushion 30 which is not deployed.

The rail induction part 72 may be extended from the rail fixing part 71 toward the panorama roof 10, and serve to guide the cushion 30. The operation unit 40 for providing a driving force to the cushion 30 may be mounted on the rail induction part 72. For example, the operation unit 40 may be detached from/attached to the rail induction part 72.

The rail support part 73 may be extended from both ends of the rail induction part 72 toward the panorama roof 10, and serve to support the guide rod 80. The guide rod 80 may be inserted and fixed to the rail support part 73.

The rail induction part 72 in accordance with the embodiment of the present invention may include an induction extension part 721 and an induction hole 722.

The induction extension part 721 may be extended from the rail fixing part 71 toward the panorama roof 10. The cushion 30 may be inserted into the induction hole 722 formed in the induction extension part 721. The induction hole 722 may be formed in the longitudinal direction of the induction extension part 721 so as to guide the cushion 30.

The induction hole 722 in accordance with the embodiment of the present invention may include a hole center part 7221 and a hole side part 7222.

The hole center part 7221 may be formed in the induction extension part 721, and gas provided by the operation unit 40 may be moved through the hole center part 7221. For example, the hole center part 7221 may be formed in the longitudinal direction of the induction extension part 721. The operation unit 40 may be fitted and coupled to the hole center part 7221, and gas discharged during the operation of the operation unit 40 may be moved along the hole center part 7221.

The hole side part 7222 may communicate with the hole center part 7221 at the outside of the induction extension part 721. For example, the hole side part 7222 may be formed at a side surface of the induction extension part 721, which faces the panorama roof 10.

The guide rail 70 in accordance with the embodiment of the present invention may further include a rail insertion part 74. The rail insertion part 74 may be extended downward from the rail induction part 72, and inserted into the frame part 13. For example, the rail insertion part 74 may be formed facing the rail induction part 72, and slid and inserted into the frame part 13 at the initial stage of the assembling process. Thus, since the guide rail 70 and the frame part 13 are temporarily assembled, the subsequent assembling process can be stably performed.

The cushion 30 in accordance with the embodiment of the present invention may include a cushion body 31, a plurality of cushion rings 32 and a cushion moving part 33.

The cushion body 31 may be folded. For example, the edge of the cushion body 31 may be sewed, and the cushion body 31 may be inflated to absorb shock of a passenger, when gas is supplied through the inflator 50. The cushion body 31 may be folded and sewed. When the sewed portion is broken by an external force, the cushion body 31 may be unfolded.

The plurality of cushion rings 32 may be formed at the edge of the cushion body 31, and the guide rod 80 may be installed through the cushion rings 32. For example, the plurality of cushion rings 32 may be mounted in the longitudinal direction of the cushion body 31, and moved along the guide rod 80.

The cushion moving part 33 may be formed on one of the cushion rings 32, and inserted into the hole center part 7221 through the hole side part 7222. The cushion moving part 33 may be formed on the leading one of the plurality of cushion rings 32.

The cushion moving part 33 in accordance with the embodiment of the present invention may include a movement insertion part 331 and a movement impelling part 332.

The movement insertion part 331 may be extended from the cushion ring 32, and inserted into the hole side part 7222. The movement impelling part 332 may be formed at an end of the movement insertion part 331, and disposed in the hole center part 7221. The movement impelling part 332 may be moved by the gas discharged from the operation unit 40. At this time, the movement impelling part 332 may be formed in a disk shape corresponding to the hole center part 7221, and moved along the hole center part 7221. The movement impelling part 332 may have a larger cross-sectional area than the movement insertion part 331. Thus, the movement impelling part 332 inserted into the hole center part 7221 may be moved in the longitudinal direction of the hole center part 7221.

The operation of the airbag device for a panorama roof in accordance with the embodiment of the present invention will be described as follows.

When a detection signal is transferred to the controller 60 due to a collision of the vehicle, the operation unit 40 may be exploded by a control signal of the controller 60. When the cushion moving parts 33 disposed at both sides of the cushion body 31 are advanced by the explosion of the operation unit 40, the folded cushion body 31 may be unfolded. At this time, the plurality of cushion rings 32 may be supported by the guide rod 80 and thus prevented from drooping.

When the cushion body 31 is unfolded, the inflator 50 may be exploded by the control signal of the controller 60. When gas is supplied into the cushion body 31 by the explosion of the inflator 50, the cushion body 31 may be inflated to absorb shock of a passenger.

Although the operation interval between the operation unit 40 and the inflator 50 may differ depending on design, the operation unit 40 may be first operated at all times, and the inflator 50 may be then operated. Thus, since the cushion body 31 is unfolded and then inflated, the airbag can be deployed more rapidly than in the related art in which the cushion body 31 is inflated while unfolded only by the gas of the inflator 50.

In the airbag device 1 for a panorama roof in accordance with the embodiment of the present invention, the cushion 30 can be unfolded by the operation unit 40, and inflated by the inflator 50, thereby rapidly protecting a passenger.

In the airbag device 1 for a panorama roof in accordance with the embodiment of the present invention, when the cushion body 31 is unfolded, the cushion rings 32 may be supported by the guide rod 80 and thus prevent the cushion body 31 from drooping.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag device for a panorama roof, comprising:
    a panorama roof;
    a guide disposed under the panorama roof;
    a folded cushion supported by the guide;
    an operation unit mounted on the guide, and configured to operate the folded cushion to cover the panorama roof;
    an inflator configured to supply gas to the cushion; and
    a controller configured to control the operations of the operation unit and the inflator,
    wherein the guide comprises:
        a guide rail disposed at both sides of the panorama roof in a longitudinal direction of the panorama roof, and
        a guide rod formed in the guide rail, and supporting the cushion.

2. The airbag device of claim 1, wherein the guide rail comprises:
    a rail fixing part disposed at both sides of the panorama roof, and seated and fixed onto a frame part;
    a rail induction part extended from the rail fixing part toward the panorama roof, configured to guide the cushion, and having the operation unit mounted thereon; and
    a rail support part extended from the rail induction part toward the panorama roof, and supporting the guide rod.

3. The airbag device of claim 2, wherein the guide rail further comprises a rail insertion part extended downward from the rail induction part and inserted into the frame part.

4. The airbag device of claim 2, wherein the rail induction part comprises:
    an induction extension part extended from the rail fixing part toward the panorama roof; and
    an induction hole formed in the induction extension part so as to guide the cushion inserted therein.

5. The airbag device of claim 4, wherein the induction hole comprises:
    a hole center part formed in the induction extension part, such that gas provided from the operation unit is moved through the hole center part; and
    a hole side part communicating with the hole center part at the outside of the induction extension part.

6. The airbag device of claim 5, wherein the cushion comprises:
    a folded cushion body;
    a plurality of cushion rings formed at the edge of the cushion body, and having the guide rod installed therethrough; and
    a cushion moving part formed on one of the cushion rings, and inserted into the hole center part through the hole side part.

7. The airbag device of claim 6, wherein the cushion moving part is formed on the leading one of the plurality of cushion rings.

8. The airbag device of claim 7, wherein the cushion moving part comprises:
    a movement insertion part extended from the leading cushion ring, and inserted into the hole side part; and
    a movement impelling part formed at an end of the movement insertion part, disposed in the hole center part, and moved by gas discharged from the operation unit.

9. The airbag device of claim 1, wherein the controller is configured to sequentially operate the operation unit and the inflator, when a vehicle accident occurs.

* * * * *